(12) United States Patent
Nishino

(10) Patent No.: US 10,556,467 B2
(45) Date of Patent: Feb. 11, 2020

(54) PNEUMATIC TIRE

(71) Applicant: The Yokohama Rubber Co., LTD., Minato-ku, Tokyo (JP)

(72) Inventor: Tomohisa Nishino, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 406 days.

(21) Appl. No.: 15/503,373

(22) PCT Filed: Jun. 19, 2015

(86) PCT No.: PCT/JP2015/067781
§ 371 (c)(1),
(2) Date: Feb. 10, 2017

(87) PCT Pub. No.: WO2016/024443
PCT Pub. Date: Feb. 18, 2016

(65) Prior Publication Data
US 2017/0239997 A1   Aug. 24, 2017

(30) Foreign Application Priority Data
Aug. 11, 2014 (JP) ................... 2014-163900

(51) Int. Cl.
*B60C 11/11*  (2006.01)
*B60C 11/12*  (2006.01)
(Continued)

(52) U.S. Cl.
CPC ............... *B60C 11/03* (2013.01); *B60C 11/11* (2013.01); *B60C 11/12* (2013.01);
(Continued)

(58) Field of Classification Search
CPC . B60C 11/1384; B60C 11/11; B60C 11/1392; B60C 11/1369;
(Continued)

(56) References Cited

U.S. PATENT DOCUMENTS 4,690,189 A * 9/1987 Bradisse ............. B60C 11/0302
152/209.15
2008/0156405 A1   7/2008 Tanabe
(Continued)

FOREIGN PATENT DOCUMENTS

CN   203142296      8/2013
CN   203418936 A *  2/2014
(Continued)

OTHER PUBLICATIONS

Machine translation for Japan 2003-072322 (Year: 2019).*
(Continued)

*Primary Examiner* — Steven D Maki
(74) *Attorney, Agent, or Firm* — Thorpe North & Western

(57) ABSTRACT

A pneumatic tire includes at least four circumferential main grooves extending in the tire circumferential direction; and at least five rows of land portions including a center land portion, a pair of second land portions, and a pair of shoulder land portions, which are defined by the circumferential main grooves. Additionally, at least one row of the second land portions is provided with a plurality of lug grooves penetrating through the second land portion in the tire width direction, and a plurality of blocks defined by the plurality of lug grooves. Moreover, the plurality of blocks include one of the circumferential narrow grooves, respectively, which penetrates through the blocks in the tire circumferential direction.

16 Claims, 7 Drawing Sheets

(51) Int. Cl.
B60C 11/13 (2006.01)
B60C 11/03 (2006.01)

(52) U.S. Cl.
CPC .......... *B60C 11/1204* (2013.01); *B60C 11/13* (2013.01); *B60C 11/1369* (2013.01); *B60C 11/1384* (2013.01); *B60C 11/1392* (2013.01); *B60C 2011/0348* (2013.01); *B60C 2011/0369* (2013.01); *B60C 2011/0372* (2013.01); *B60C 2011/129* (2013.01); *B60C 2011/1213* (2013.01)

(58) Field of Classification Search
CPC ..... B60C 2011/0372; B60C 2011/1213; B60C 2011/0348; B60C 2011/129; B60C 2011/0369
See application file for complete search history.

(56) References Cited

U.S. PATENT DOCUMENTS

| | | | | |
|---|---|---|---|---|
| 2009/0229721 | A1* | 9/2009 | Ikeda | B60C 11/0306 152/209.18 |
| 2017/0305201 | A1* | 10/2017 | Akashi | B60C 11/03 |
| 2018/0022162 | A1* | 1/2018 | Takemori | B60C 11/01 152/209.18 |
| 2018/0043737 | A1* | 2/2018 | Akashi | B60C 11/01 |

FOREIGN PATENT DOCUMENTS

| | | | |
|---|---|---|---|
| JP | S61-271104 | | 12/1986 |
| JP | 08-142612 | A * | 6/1996 |
| JP | 2000-309206 | A * | 11/2000 |
| JP | 2002-240513 | A * | 8/2002 |
| JP | 2003-054223 | | 2/2003 |
| JP | 2003-072322 | A * | 3/2003 |
| JP | 3894743 | | 3/2007 |
| JP | 4316452 | | 8/2009 |
| JP | 2010-274695 | | 12/2010 |
| JP | 4677408 | | 4/2011 |
| JP | 2012-006541 | | 1/2012 |
| WO | WO 2006/022120 | | 3/2006 |

OTHER PUBLICATIONS

Machine translation for Japan 2002-240513 (Year: 2019).*
Machine translation for 2000-309206 (Year: 2019).*
Machine translation for Japan 08-142612 (Year: 2019).*
Machine translation for China 203418936 (Year: 2019).*
International Search Report for International Application No. PCT/JP2015/067781 dated Aug. 25, 2015, 4 pages, Japan.

* cited by examiner

| | CONVENTIONAL EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|---|
| CIRCUMFERENTIAL NARROW GROOVE IN SECOND LAND PORTION | ABSENT | PRESENT | PRESENT | PRESENT | PRESENT | PRESENT | PRESENT | PRESENT | PRESENT |
| SHAPE OF CIRCUMFERENTIAL NARROW GROOVE | - | STRAIGHT LINE | ZIGZAG SHAPE | BENT SHAPE | BENT SHAPE (CRANK SHAPE) | BENT SHAPE (Z-SHAPE) | BENT SHAPE (Z-SHAPE) | BENT SHAPE (Z-SHAPE) | BENT SHAPE (Z-SHAPE) |
| INCLINATION ANGLES $\alpha_1$ AND $\alpha_2$ OF CIRCUMFERENTIAL NARROW GROOVES (DEGREES) | - | - | $\alpha_1 = -45$ $\alpha_2 = 45$ | $\alpha_1 = 0$ $\alpha_2 = 135$ | $\alpha_1 = 0$ $\alpha_2 = 90$ | $\alpha_1 = 0$ $\alpha_2 = 60$ | $\alpha_1 = 0$ $\alpha_2 = 60$ | $\alpha_1 = 0$ $\alpha_2 = 60$ | $\alpha_1 = 0$ $\alpha_2 = 60$ |
| INCLINATION ANGLES $\theta_1$ AND $\theta_2$ OF LUG GROOVES IN SECOND LAND PORTION (DEGREES) | $\theta_1 = \theta_2 = 50$ | $\theta_1 = \theta_2 = 50$ | $\theta_1 = \theta_2 = 50$ | $\theta_1 = \theta_2 = 50$ | $\theta_1 = \theta_2 = 50$ | $\theta_1 = \theta_2 = 50$ | $\theta_1 = 50$ $\theta_2 = 25$ | $\theta_1 = 50$ $\theta_2 = 25$ | $\theta_1 = 50$ $\theta_2 = 25$ |
| GROOVE WIDTHS OF LUG GROOVES IN SECOND LAND PORTION (EQUATORIAL PLANE SIDE (mm) / GROUND CONTACT EDGE SIDE (mm)) | 8/8 | 8/8 | 8/8 | 8/8 | 8/8 | 8/8 | 8/8 | 8/12 | 8/12 |
| PRESENCE/ABSENCE OF CHAMFERED PORTION OF BLOCKS OF SECOND LAND PORTION | ABSENT | ABSENT | ABSENT | ABSENT | ABSENT | ABSENT | ABSENT | ABSENT | PRESENT |
| PERFORMANCE ON SNOW | 100 | 102 | 103 | 105 | 107 | 109 | 111 | 115 | 113 |
| WEAR RESISTANCE | 100 | 105 | 106 | 106 | 107 | 108 | 110 | 112 | 115 |
| NOISE PERFORMANCE | 100 | 100 | 100 | 100 | 102 | 104 | 106 | 108 | 110 |

FIG. 7

PNEUMATIC TIRE

TECHNICAL FIELD

The present technology relates to a pneumatic tire, and particularly relates to a pneumatic tire with enhanced performance on snow and enhanced uneven wear resistance performance.

BACKGROUND ART

With conventional pneumatic tires, performance on snow of a tire is enhanced by utilizing block patterns to increase traction characteristics.

The technology disclosed in Japanese Patent No. 4677408B is a known conventional pneumatic tire that utilizes such a configuration. However, with configurations utilizing block patterns, there is a problem in that uneven wear of the blocks must be suppressed.

SUMMARY

The present technology provides a pneumatic tire with enhanced performance on snow and enhanced uneven wear resistance performance.

The pneumatic tire according to the present technology includes at least four circumferential main grooves extending in a tire circumferential direction; and a least five land portions including a center land portion, a pair of second land portions, and a pair of shoulder land portions that are defined by the circumferential main grooves. In such a pneumatic tire, at least one second land portion of the pair of second land portions includes a plurality of lug grooves penetrating through the at least one second land portion in a tire width direction, and a plurality of blocks defined by the plurality of lug grooves. Additionally, the plurality of blocks each include one circumferential narrow groove penetrating through the block in the tire circumferential direction.

With the pneumatic tire according to the present technology, the blocks in the second land portion each include one circumferential narrow groove penetrating through the block in the tire circumferential direction. As such, rigidity in the tire width direction of each block is alleviated. As a result, there are advantages in that the ground contact patch pressure of the blocks when the tire contacts the ground is reduced, and uneven wear of the blocks is suppressed. Additionally, there are advantages in that the edge components of the blocks are increased due to the circumferential narrow grooves, and the performance on snow of the tire is enhanced.

BRIEF DESCRIPTION OF DRAWINGS

FIG. 7 is a table showing results of performance testing of pneumatic tires according to embodiments of the present technology.

DETAILED DESCRIPTION

The technology is described in detail below while referring to the accompanying drawings. However, the technology is not limited to the embodiments. In addition, the components of the embodiments include components that are replaceable while maintaining consistency with the technology, and obviously replaceable components. Furthermore, the plurality of modified examples described in the embodiments may be freely combined within the scope of obviousness to a person skilled in the art.

Pneumatic Tire

Figure 1:
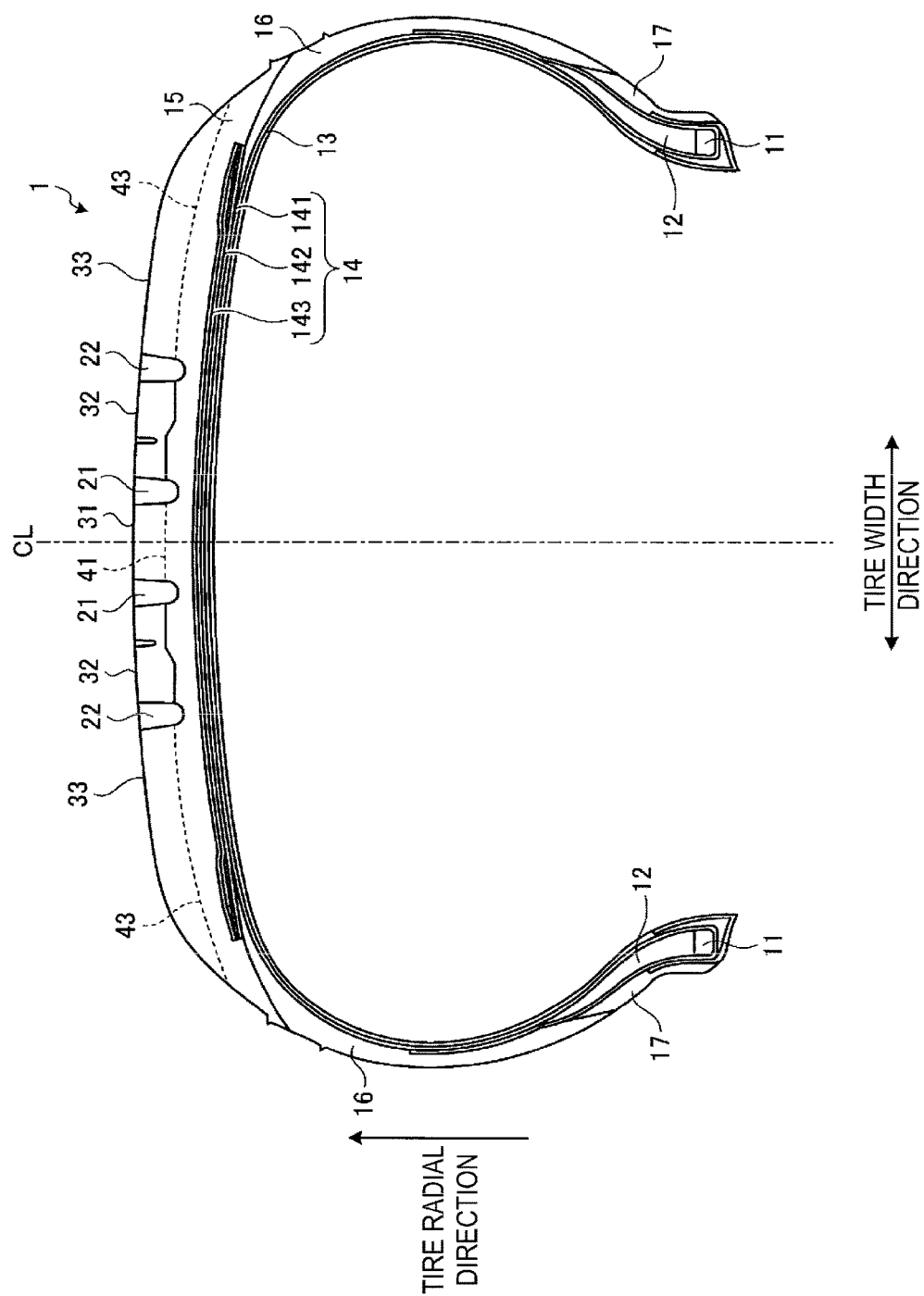
FIG. 1 is a cross-sectional view along a tire meridian direction illustrating a pneumatic tire according to an embodiment of the technology.

FIG. 1 is a cross-sectional view along a tire meridian direction illustrating a pneumatic tire according to an embodiment of the technology. FIG. 1 illustrates a cross-sectional view of a region to one side in the tire radial direction. Additionally, FIG. 1 illustrates a radial tire for a passenger vehicle as an example of a pneumatic tire.

For FIG. 1, "cross section along a tire meridian direction" refers to a cross section of the tire taken along a plane that includes the tire rotation axis (not illustrated). The reference sign "CL" denotes the tire equatorial plane and refers to a plane normal to the tire rotation axis that passes through the center point of the tire in the tire rotation axis direction. The term "tire width direction" refers to a direction parallel to the tire rotation axis. The term "tire radial direction" refers to a direction normal to the tire rotation axis.

The pneumatic tire 1 has an annular structure centered on the tire rotational axis and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 constitute the cores of the left and right bead portions, and are annular members constituted by a plurality of bead wires bundled together. The pair of bead fillers 12, 12 are disposed on peripheries of the pair of bead cores 11, 11 in the tire radial direction and constitute the bead portions.

The carcass layer 13 has a single-layer structure formed from one carcass layer or a multi-layer structure formed by layering a plurality of carcass plies, and stretches between the left and right bead cores 11, 11 in toroidal form, forming a framework for the tire. Additionally, both ends of the carcass layer 13 are folded outwardly in the tire width direction so as to wrap around the bead cores 11 and the bead fillers 12, and fixed. The carcass ply of the carcass layer 13 is constituted by a plurality of carcass cords formed from steel or organic fibers (e.g. aramid, nylon, polyester, rayon, or the like) covered by a coating rubber and subjected to a rolling process, and has a carcass angle (inclination angle of the fiber direction of the carcass cords with respect to the tire circumferential direction), as an absolute value, of from 80 degrees to 95 degrees.

The belt layer 14 is formed by layering a pair of cross belts 141, 142, and a belt cover 143. The belt layer 14 is disposed around the periphery of the carcass layer 13. The pair of cross belts 141, 142 are constituted by a plurality of belt cords formed from steel or organic fibers, covered by coating rubber, and subjected to a rolling process, and have belt angles, as an absolute value, from 20 degrees to 55 degrees. Furthermore, the pair of cross belts 141, 142 have belt angles (inclination angle of the fiber direction of the belt cords with respect to the tire circumferential direction) of opposite signs, and the belts are layered so that the fiber directions of the belt cords intersect each other (crossply configuration). The belt cover 143 is constituted by a plurality of cords formed from steel or an organic fiber material, covered by coating rubber, and subjected to a rolling process, having a belt angle, as an absolute value, from 0 to 10 degrees. Moreover, the belt cover 143 is disposed in a layered manner outward of the cross belts 141, 142 in the tire radial direction.

The tread rubber 15 is disposed on the periphery of the carcass layer 13 and the belt layer 14 in the tire radial direction, and constitutes a tread portion. The pair of the sidewall rubbers 16, 16 are disposed outward of the carcass layer 13 in the tire width direction. The sidewall rubbers 16, 16 constitute sidewall portions on the left and right sides. The pair of rim cushion rubbers 17, 17 are disposed inward of the left and right bead cores 11, 11 and the folded back portion of the carcass layer 13 in the tire radial direction. The pair of rim cushion rubbers 17, 17 constitute the contact surfaces of the left and right bead portions with the rim flanges.

Tread Pattern

Figure 2:
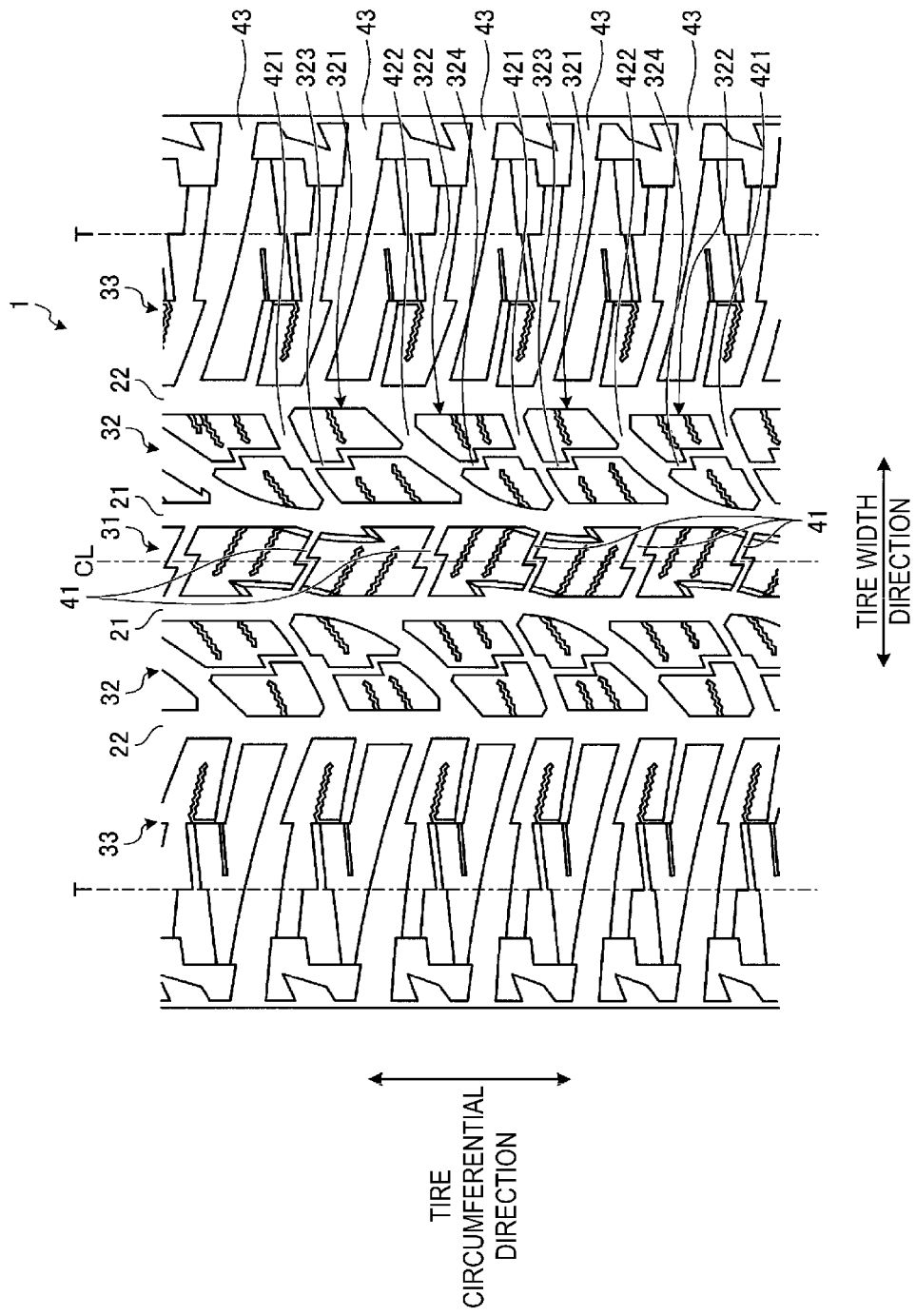
FIG. 2 is a plan view illustrating a tread surface of the pneumatic tire depicted in FIG. 1.

FIG. 2 is a plan view illustrating a tread surface of the pneumatic tire 1 depicted in FIG. 1. FIG. 2 illustrates a tread pattern for an all-season tire. For this drawing, "tire circumferential direction" refers to the direction revolving about the tire rotational axis. Additionally, the reference sign T denotes a tire ground contact edge.

As illustrated in FIG. 2, the pneumatic tire 1 is provided with, in the tread portion, a plurality of circumferential main grooves 21, 22 extending in the tire circumferential direction; a plurality of land portions 31 to 33 defined by the circumferential main grooves 21, 22; and a plurality of lug grooves 41, 421, 422, 43 disposed in the land portions 31 to 33.

Herein, the term "circumferential main grooves" refers to circumferential grooves having a wear indicator that indicates the terminal stage of wear, typically having a groove width of not less than 5.0 mm and a groove depth of not less than 7.5 mm. Moreover, the term "lug grooves" refers to lateral grooves having a groove width of 2.0 mm or greater, and a groove depth of 3.0 mm or greater. Additionally, the term "sipe", which will be described hereinafter, refers to a cut formed in a land portion, typically with a sipe width of less than 1.5 mm.

The groove width is measured in a state where the tire is mounted on a specified rim, inflated to a specified internal pressure, and is in an unloaded state and is the maximum value for the distance between left and right groove walls at a groove opening portion. In a configuration where edge portions of the land portions include a notched portion or a chamfered portion, in a cross-sectional view in which a groove length direction is a normal line direction, the groove width is measured with reference to a crossing point of the tread road contact surface with extension lines of the groove walls. Additionally, in a configuration where the grooves extend in a zigzag shape or in a wave shape in the tire circumferential direction, the groove width is measured with reference to the center lines of the amplitudes of the groove walls.

The groove depth is measured in a state where the tire is mounted on a specified rim, inflated to a specified internal pressure, and is in an unloaded state and is the maximum value of the distance from the tread road contact surface to the groove bottom. Additionally, in a configuration where the grooves include, in some parts, uneven portions and/or sipes at the groove bottom, the groove depth is measured without taking these portions into consideration.

The term "specified rim" refers to an "applicable rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). Furthermore, "specified internal pressure" refers to "maximum air pressure" defined by JATMA, a maximum value in "tire load limits at various cold inflation pressures" defined by TRA, or "inflation pressures" defined by ETRTO. "Specified load" refers to a "maximum load capacity" as defined by JATMA, the maximum value in "TIRE LOAD LIMITS AT VARIOUS COLD INFLATION PRESSURES" as defined by TRA, or a "LOAD CAPACITY" as defined by ETRTO. Note that, according to JATMA, for a passenger vehicle tire, the specified internal pressure is an air pressure of 180 kPa, and the specified load is 88% of maximum load capacity.

For example, in the configuration in FIG. 2, four circumferential main grooves 21, 22 are disposed with point symmetry relative to a point on the tire equatorial plane CL. Additionally, five rows of land portions 31 to 33 are defined by the four circumferential main grooves 21, 22. Furthermore, one of the land portions 31 is disposed on the tire equatorial plane CL.

However, the configuration is not limited to such and five or more circumferential main grooves may be disposed (not illustrated). Additionally, the circumferential main grooves 21, 22 may be disposed with left-right asymmetry relative to the tire equatorial plane CL (not illustrated). Furthermore, a circumferential main groove may be disposed on the tire equatorial plane CL (not illustrated). Thus, it is possible to dispose the land portion 31 at positions deviated from the tire equatorial plane CL.

In the configuration illustrated in FIG. 2, the four circumferential main grooves 21, 22 have a straight shape overall, and the left and right land portions 31 to 33 have edge portions that project toward the circumferential main grooves 21, 22. As such, the groove walls of each of the circumferential main grooves 21, 22 change in a step-like manner toward the tire circumferential direction.

However, the configuration is not limited to such and the circumferential main grooves 21, 22 may have simple straight shapes, or may have zigzag shapes or wave-like shapes that extend while bending or curving in the tire circumferential direction (not illustrated).

Here, the left and right circumferential main grooves 22, 22 outermost in the tire width direction are referred to as outermost circumferential main grooves. Additionally, a tread portion center region and tread portion shoulder regions are defined with the left and right outermost circumferential main grooves 22, 22 as boundaries.

Additionally, the land portions 33, 33 located outward in the tire width direction and defined by the left and right outermost circumferential main grooves 22, 22, are referred to as shoulder land portions. The left and right shoulder land portions 33, 33 are disposed on left and right tire ground contact edges T, T, respectively. Additionally, the left and right land portions 32, 32 located inward in the tire width direction and defined by the outermost circumferential main grooves 22, 22, are referred to as second land portions. Accordingly, the second land portions 32 are adjacent to the outermost circumferential main grooves 22. Furthermore, the land portion 31 located inward of the left and right second land portions 32, 32 in the tire width direction is referred to as a center land portion. In the configuration illustrated in FIG. 2, only one center land portion 31 is provided, but in configurations provided with five or more circumferential main grooves, a plurality of center land portions 31 are defined.

In the configuration illustrated in FIG. 2, the land portions 31 to 33 include the plurality of lug grooves 41, 421, 422, 43, which extend in the tire width direction. Additionally, the lug grooves 41, 421, 422, 43 have an open structure penetrating through the land portions 31 to 33 in the tire width direction, and are arranged with a predetermined pitch in the tire circumferential direction. As a result, the land portions 31 to 33 are divided into a plurality of blocks in the tire circumferential direction by the lug grooves 41, 421, 422, 43, and constitute rows of blocks.

However, the configuration is not limited to such and, for example, the lug grooves 41 in the center land portion 31 or the lug grooves 43 in the shoulder land portions 33 may have a semi-closed structure in which one end portion terminates within the corresponding land portion 31, 33 (not illustrated). In this case, the land portions 31, 33 constitute a rib that is continuous in the tire circumferential direction.

Center Land Portion and Second Land Portions

Figure 3:
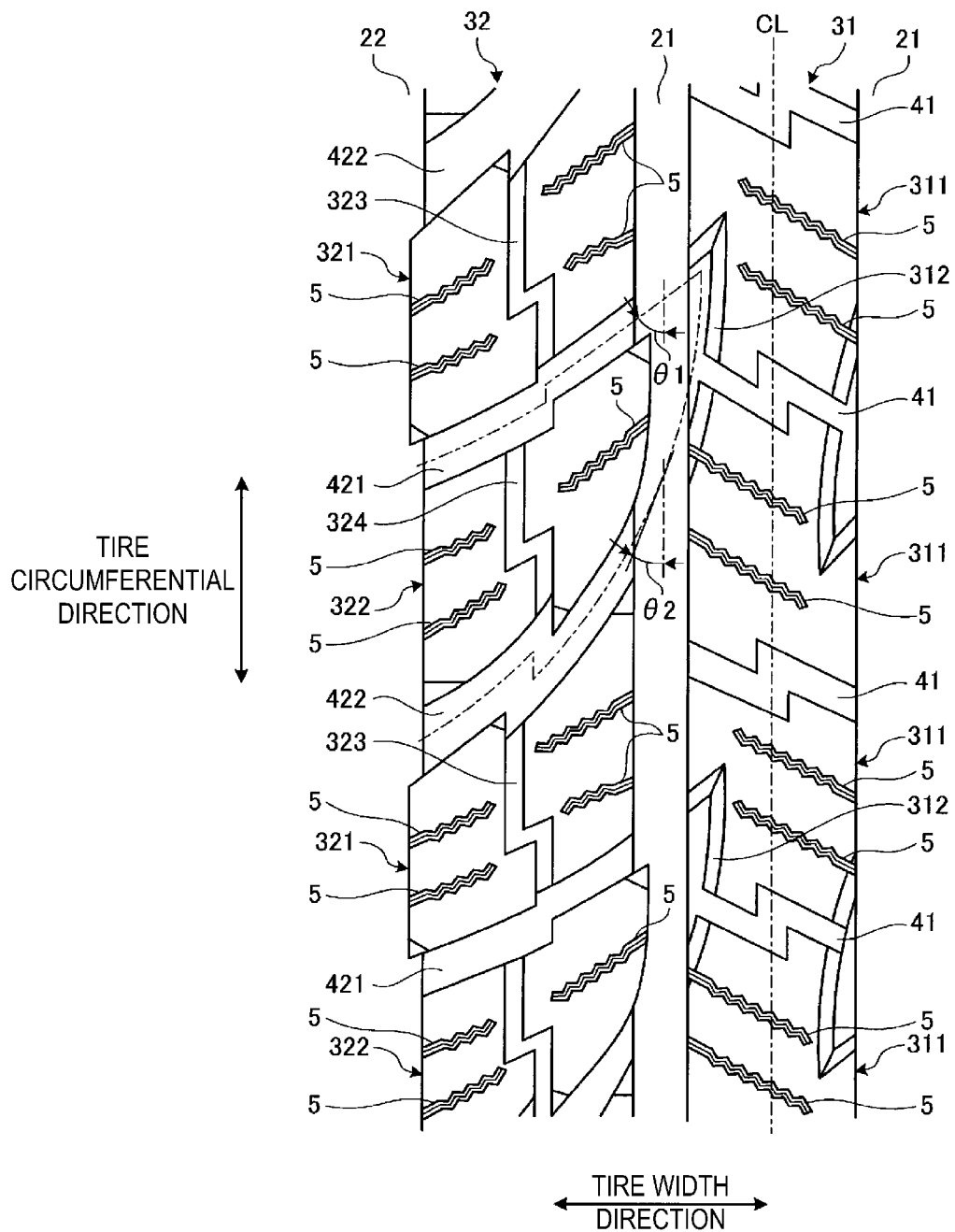
FIG. 3 is an explanatory drawing illustrating a main portion of the pneumatic tire depicted in FIG. 2.
Figure 4:
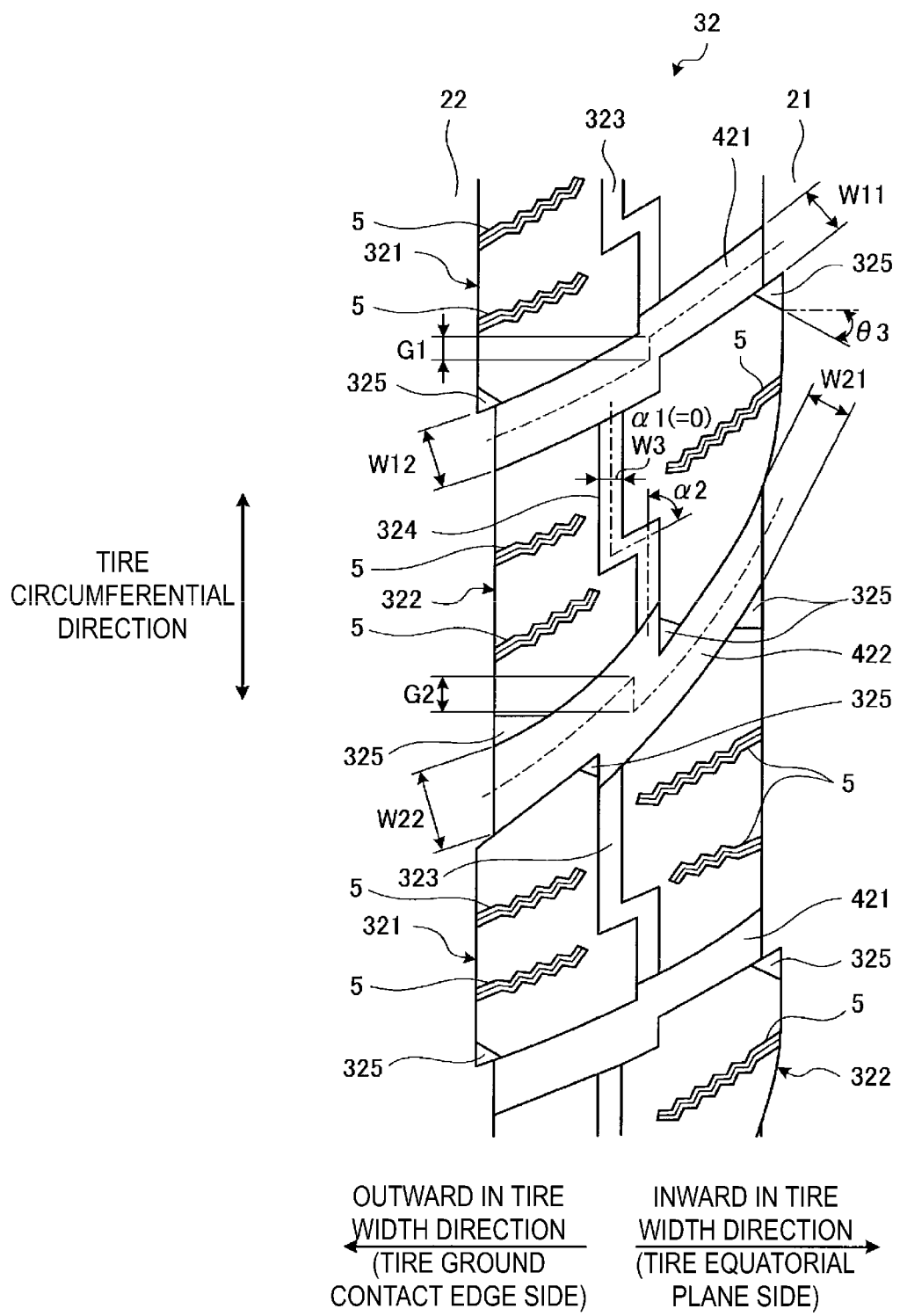
FIG. 4 is an explanatory drawing illustrating a main portion of the pneumatic tire depicted in FIG. 2.
Figure 5:
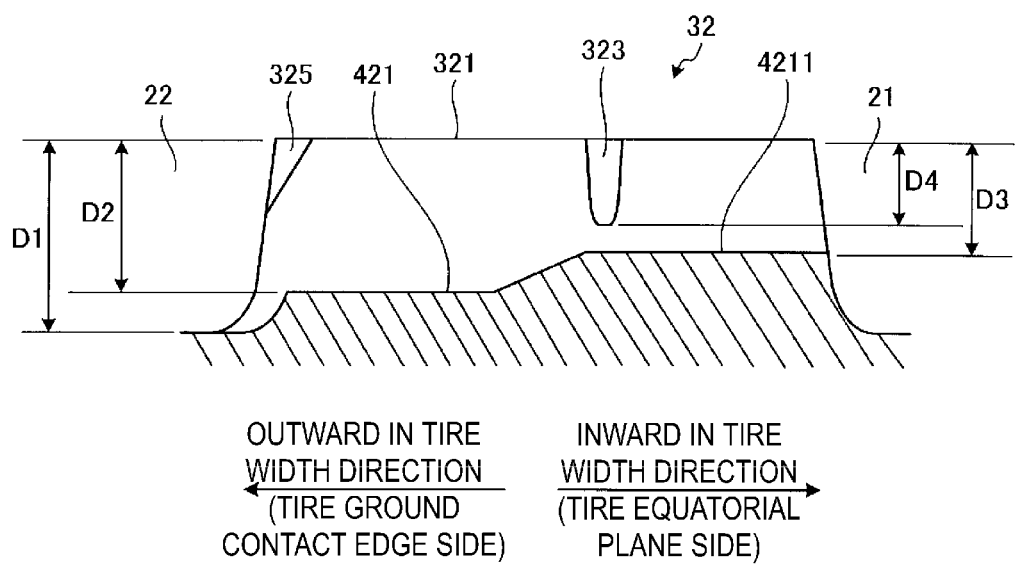
FIG. 5 is an explanatory drawing illustrating a main portion of the pneumatic tire depicted in FIG. 2.

FIGS. 3 to 5 are explanatory drawings illustrating a main portion of the pneumatic tire depicted in FIG. 2. In these drawings, FIG. 3 is an enlarged plan view of the center land portion 31 and one of the second land portions 32, and FIG. 4 is an enlarged plan view of the second land portion 32. FIG. 5 is a cross-sectional view of the second land portion 32, taken along the lug groove 421.

As illustrated in FIG. 3, in the pneumatic tire 1, the second land portion 32 is provided with a plurality of lug grooves 421, 422 penetrating through the second land portion 32 in the tire width direction, and a plurality of blocks 321, 322 defined by these lug grooves 421, 422. As a result, the second land portion 32 is a row of blocks.

For example, in the configuration illustrated in FIG. 3, the plurality of lug grooves 421, 422 penetrate through the second land portion 32 in the tire width direction, and have an open structure. Specifically, the lug grooves 421, 422 open to the circumferential main grooves 21, 22 on the left and right sides of the second land portion 32. Additionally, the second land portion 32 includes two types of the lug grooves 421, 422 and these lug grooves 421, 422 have inclination angles, groove forms, and groove widths that are mutually different. Furthermore, the two types of lug grooves 421, 422 are alternately disposed in the tire circumferential direction and, as a result, two types of blocks 321, 322 having mutually different shapes are formed. Moreover, the two types of blocks 321, 322 are alternately disposed in the tire circumferential direction.

However, the configuration is not limited to such and three or more types of blocks may be arranged in the tire circumferential direction by alternately arranging three or more types of mutually different lug grooves in the tire circumferential direction (not illustrated). Here, it is preferable that the blocks adjacent to each other in the tire circumferential direction have mutually different shapes. As a result, air column resonance when the tire contacts the ground is effectively blocked and external noise is reduced.

In the configuration illustrated in FIG. 3, crossing angles θ1, θ2 of the lug grooves 421, 422 with the circumferential main groove 21 on the tire equatorial plane CL side of the second land portion 32 is in a range of not less than 15 degrees and not greater than 75 degrees. Additionally, the pair of lug grooves 421, 422 adjacent to each other in the tire circumferential direction are inclined in the same direction with respect to the tire circumferential direction and have mutually different crossing angles θ1, θ2. Specifically, the crossing angle θ1 of the first lug groove 421 is such that 50 degrees≤θ1≤75 degrees, and the crossing angle θ2 of the second lug groove 422 is such that 15 degrees ≤θ2≤40 degrees. Moreover, extension lines of groove center lines of the pair of lug grooves 421, 422 cross each other at an edge portion of the center land portion 31 adjacent to the second land portion 32.

The crossing angles θ1, θ2 of the lug grooves 421, 422 with the circumferential main groove 21 are measured at a crossing point of the extension lines of the groove center lines of the lug grooves 421, 422 with the groove center line of the circumferential main groove 21.

In the configuration illustrated in FIG. 3, the center land portion 31 includes a plurality of lug grooves 41 penetrating through the center land portion 31 in the tire width direction. Additionally, these lug grooves 41 have a Z-shaped or crank-shaped bent portion and are disposed at a predetermined pitch in the tire circumferential direction. The center land portion 31 is divided in the tire circumferential direction into a plurality of blocks 311 by these lug grooves 41. Additionally, the edge portion of the center land portion 31 on the second land portion 32 side includes a notched portion 312 in a region that includes the crossing point of the extension lines of the groove center lines of the pair of lug grooves 421, 422. Moreover, the notched portion 312 is formed straddling two of the blocks 311, 311 adjacent to each other in the tire circumferential direction, and has a substantially L-shaped wall face surrounding the extension lines of the groove center lines of the pair of lug grooves 421, 422.

In the configuration illustrated in FIG. 3, the two types of blocks 321, 322 of the second land portion 32 are disposed so as to be alternately offset to the left and right in the tire width direction. As such, the edge portion of the first block 322 of the blocks 321, 322 adjacent to each other in the tire circumferential direction projects into the circumferential main groove 21 on the tire equatorial plane CL side. In contrast, the edge portion of the center land portion 31 on the second land portion 32 side has the notched portion 312 described above. Therefore, the circumferential main groove 21 has an increased width at the projecting position of the block 322 of the second land portion 32. As a result, the groove width of the circumferential main groove 21 is substantially constant in the tire circumferential direction, and water drainage performance of the tire is ensured.

As illustrated in FIG. 4, the lug grooves 421, 422 in the second land portion 32 have a bent shape including a Z-shaped or crank shaped bent portion. Particularly, in the configuration illustrated in FIG. 4, the lug grooves 421, 422 have an offset shape in which the groove center line on the tire equatorial plane CL side and the groove center line on the tire ground contact edge T side are mutually offset in the tire circumferential direction at crossing positions with circumferential narrow grooves 323, 324 (described later). As a result, the edge components of the lug grooves 421, 422 are increased and traction characteristics are enhanced.

The offset directions of the offset shapes of the pair of lug grooves 421, 422 adjacent to each other in the tire circumferential direction are configured to be mutually opposite directions. Specifically, because the groove center lines of the lug grooves 421, 422 adjacent to each other are offset in mutually different directions in the tire circumferential direction, length in the tire circumferential direction, of portions (the portion on the tire ground contact edge T side of the block 321 divided by the circumferential narrow groove 323, and the portion on the tire equatorial plane CL side of the block 322 divided by the circumferential narrow groove 324) of the blocks 321, 322 where width is reduced due to the difference between the inclination angles θ1, θ2 of the lug grooves 421, 422, is suitably ensured. As a result, rigidity of the portions of the blocks 321, 322 where the width is reduced is suitably ensured. Note that in the configuration described above, offset amounts G1, G2 of the offset shapes of the lug grooves 421, 422 are configured to be in a range of not less than 2.0 mm and not greater than 12.0 mm.

In the configuration illustrated in FIG. 4, opening widths W11, W21, of the lug grooves 421, 422 in the second land portion 32 on the tire equatorial plane CL side, are narrower than opening widths W12, W22 on the tire ground contact edge T side. As a result, air column resonance is blocked and external noise is reduced. Additionally, rigidity in the region of the blocks 321, 322 of the second land portion 32 on the tire equatorial plane CL side is ensured and uneven wear of the blocks 321, 322 is suppressed.

As illustrated in FIG. 5, the lug grooves 421 (422) in the second land portion 32 include a raised bottom portion 4211 in a region from the circumferential narrow grooves 323 (324) (described later) to the tire equatorial plane CL side. As a result, air column resonance is blocked and external noise is reduced. Additionally, rigidity in the region of the blocks 321, 322 of the second land portion 32 on the tire equatorial plane CL side is ensured and uneven wear of the blocks 321, 322 is suppressed.

In FIG. 5, a maximum groove depth D2 of the lug grooves 421 (422) in the second land portion 32 is configured to be such that $0.6 \leq D2/D1 \leq 0.8$, with respect to a groove depth D1 of the outermost circumferential main groove 21. Additionally, a groove depth D3 at the raised bottom portion 4211 of the lug grooves 421 (422) is configured to be such that $0.2 \leq D3/D1 \leq 0.5$, with respect to the groove depth D1 of the outermost circumferential main groove 21.

Note that as described above, in the configuration illustrated in FIG. 3, the lug groove 41 in the center land portion 31 and the lug grooves 421, 422 in the second land portion 32 have a Z-shape or a crank shape, causing the groove center lines to be offset in the tire circumferential direction. Such a configuration is preferable because the edge components of the land portions 31, 32 will increase and the performance on snow on the tire will be enhanced.

However, the configuration is not limited to such, and the lug groove 41 in the center land portion 31 and the lug grooves 421, 422 in the second land portion 32 may have a straight shape or an arc shape without a bent portion (not illustrated).

Circumferential Narrow Groove in the Second Land Portion

As illustrated in FIGS. 3 and 4, in the pneumatic tire 1, the blocks 321, 322 of the second land portion 32 respectively include one circumferential narrow groove 323, 324. Additionally, the circumferential narrow grooves 323, 324 respectively penetrate through the blocks 321, 322 in the tire circumferential direction so as to respectively penetrate through the lug grooves 421, 422 in the second land portion 32. As a result, the blocks 321, 322 are divided in the tire width direction, and the ground contact patch pressure of the blocks 321, 322 when the tire contacts the ground is made uniform.

For example, in the configuration illustrated in FIG. 4, the circumferential narrow grooves 323, 324 are disposed in central regions in the tire width direction of the blocks 321, 322 (in regions ⅓ the block width) so as to substantially bisect the road contact surface of the blocks 321, 322 in the tire width direction. Additionally, the circumferential narrow grooves 323, 324 include a Z-shaped or crank shaped bent portion that has an amplitude in the tire width direction. As a result, the edge components of the blocks 321, 322 increase and traction characteristics (snow pillar shearing force) of the tire is enhanced. Specifically, the circumferential narrow grooves 323, 324 include a first inclined portion inclining at an inclination angle α1 substantially parallel with the tire circumferential direction; and a second inclined portion inclining at an inclination angle α2 with respect to the tire width direction. Here, the first inclined portion and the second inclined portion are connected alternately. Additionally, it is preferable that the inclination angle α1 of the first inclined portion is such that $0 \text{ degrees} \leq \alpha 1 \leq 15 \text{ degrees}$, and the inclination angle α2 of the second inclined portion is such that $45 \text{ degrees} \leq \alpha 2 \leq 90 \text{ degrees}$. Additionally, it is preferable that the inclination angle α2 of the second inclined portion is such that $\alpha 2 < 90$ degrees. In such a configuration, traction characteristics of the tire are effectively enhanced by the edge components of the bent portions of the circumferential narrow grooves 323, 324. Note that the inclination angles α1, α2 are defined in a range of not less than 0 degrees and less than 180 degrees with reference to the inclination direction of the inclination angle α1.

The bent portions of the circumferential narrow grooves 323, 324 are disposed in central portions (the central portions when the blocks 321, 322 are trisected in the tire circumferential direction) in the tire circumferential direction of the blocks 321, 322. As a result, rigidity in the tire circumferential direction of the blocks 321, 322 is made uniform.

The groove width W3 of the circumferential narrow grooves 323, 324 is configured such that the circumferential narrow grooves 323, 324 do not close at a contact surface between the tire and a flat plate when the tire is mounted on a specified rim, inflated to the specified internal pressure, placed perpendicularly with respect to the flat plate in a static state, and loaded with a load corresponding to a specified load. Specifically, the width W3 of the circumferential narrow grooves 323, 324 is configured such that $1.5 \text{ mm} \leq W3 \leq 6.0 \text{ mm}$. As a result, the circumferential narrow grooves 323, 324 divide the blocks 321, 322 in the tire width direction when the tire contacts the ground, and the ground contact patch pressure of the blocks 321, 322 is made uniform. Additionally, because the circumferential narrow grooves 323, 324 are in an open state when the tire contacts the ground, the edge components of the blocks 321, 322 are ensured and traction characteristics of the tire are enhanced.

The circumferential narrow grooves 323, 324 adjacent to each other in the tire circumferential direction open at mutually different positions with respect to common lug grooves 421, 422. In other words, the opening portions of circumferential narrow grooves 323, 324 on either side of the lug grooves 421, 422 are disposed such that positions thereof are offset from each other in the tire width direction. Accordingly, the opening portions of circumferential narrow grooves 323, 324 adjacent to each other are disposed so as to be dispersed in the tire width direction. As a result, overall rigidity of the second land portion 32 is made uniform.

In FIG. 5, a groove depth D4 of the circumferential narrow groove 323 (324) is configured to be shallower than the groove depths D2, D3 of the lug groove 421, and such that $0.3 \leq D4/D1 \leq 0.6$, with respect to the groove depth D1 of the outermost circumferential main groove 22. As a result, the functions of the circumferential narrow groove 323 (324) are suitably ensured.

Note that, as described above, in the configuration illustrated in FIG. 4, the circumferential narrow grooves 323, 324 in the second land portion 32 include a Z-shaped or crank shaped bent portion that has an amplitude in the tire width direction. Such a configuration is preferable because the edge components of the land portions 31, 32 will increase and the performance on snow on the tire will be enhanced.

However, the configuration is not limited to such, and the circumferential narrow grooves 323, 324 may have a straight shape, an arc shape, or a wave-like shape (not illustrated).

Sipes of the Blocks

As illustrated in FIGS. 3 and 4, the blocks 311 of the center land portion 31 and the blocks 321, 322 of the second land portion 32 each include a plurality of sipes 5. As a result, the edge components of the blocks 311, 321, 322 increase and traction characteristics are enhanced.

For example, in the configuration illustrated in FIG. 3, each block 311 of the center land portion 31 includes two sipes 5. Additionally, these sipes 5 have a semi-closed structure in which a first end portion opens at the edge portion of the block 311 and a second end portion terminates within the block 311. Moreover, the terminating end portions of the sipes 5 and the notched portion 312 described above are separated within the block 311, and the sipes 5 are not in communication with the notched portion 312. Accordingly, each of the blocks 311 has a continuous road contact surface that is not divided by the sipes 5 and the notched portion 312.

In one of the blocks 311, two of the sipes 5 are disposed substantially parallel with the inclination direction of the lug groove 41. That is, two of the sipes 5 are disposed so as to substantially equally divide the block 311 in the tire circumferential direction. Specifically, the sipes 5 are disposed at substantially equal intervals in the tire circumferential direction such that a ratio of circumferential lengths of the portions of the block 311 defined by the two sipes 5 is in a range of not less than 0.8 and not greater than 1.2. As a result, rigidity of the portions of the block 311 defined by the sipes 5 is made uniform.

In one of the blocks 311, all of the sipes 5 open to a first edge portion in the tire width direction of the block 311. Specifically, as described above, the extension lines of the groove center lines of the lug grooves 421, 422 in the second land portion 32 cross at the first edge portion of the center land portion 31, and the notched portion 312 is formed at this edge portion. In contrast, the sipes 5 in the center land portion 31 open to a second edge portion where the notched portion 312 of the block 311 is not provided. As a result, the positional relationship between the notched portion 312 and the sipes 5 is appropriately adjusted, and rigidity of each block 3111 is made uniform.

In the blocks 311, 311 adjacent to each other in the tire circumferential direction, the sipes 5 open to edge portions on mutually different sides in the tire width direction. As a result, overall rigidity of the center land portion 31 is made uniform in the tire circumferential direction.

In the configuration illustrated in FIG. 3, the blocks 321, 322 of the second land portion 32 each include three or four of the sipes 5. These sipes 5 have a semi-closed structure in which a first end portion opens at the edge portion of the blocks 321, 322 and a second end portion terminates within the blocks 321, 322. Moreover, the terminating end portions of the sipes 5 and the circumferential narrow grooves 323, 324 described above are separated within the blocks 321, 322, and the sipes 5 are not in communication with the circumferential narrow grooves 323, 324. Accordingly, each of the blocks 321, 322 is divided in the tire width direction only by the circumferential narrow grooves 323, 324 and is not divided by the sipes 5. As such, left and right portions of the blocks 321, 322, divided by the circumferential narrow grooves 323, 324, have a road contact surface that is continuous in the tire circumferential direction.

In one of the blocks 321, 322, all of the sipes 5 are disposed substantially parallel with the inclination direction of the lug grooves 421, 422. That is, all of the sipes 5 are disposed so as to equally divide the blocks 321, 322 in the tire circumferential direction. Specifically, the left and right portions of the blocks 321, 322 divided by the circumferential narrow grooves 323, 324 include one or two of the sipes 5, respectively, and are defined in the tire circumferential direction by these sipes 5. Here, disposal positions of the sipes 5 are specified such that a ratio of circumferential lengths of the portions of the blocks 321, 322 defined by the sipes 5 is in a range of not less than 0.8 and not greater than 1.2. As a result, rigidity of the portions of the blocks 321, 322 defined by the circumferential narrow grooves 323, 324 and the sipes 5 is made uniform.

A ratio of a disposal density of the sipes 5 in a first portion to a disposal density of the sipes 5 in a second portion of the blocks 321, 322 divided by the circumferential narrow grooves 323, 324 is in a range of not less than 0.8 to not greater than 1.2. As a result, rigidity of the left and right regions of the blocks 321, 322 divided by the circumferential narrow grooves 323, 324 is made uniform.

The sipes 5 in the center land portion 31 and the second land portion 32 are both three-dimensional sipes.

A three-dimensional sipe is a sipe that has a sipe wall face with a bent shape in the sipe width direction when viewed as a cross-section in which the sipe length direction is the normal line direction. Compared to the two-dimensional sipes, three-dimensional sipes have a greater mating force between opposing sipe wall faces and, therefore, act to reinforce the rigidity of the land portions. Three-dimensional sipes may have a straight shape, a zigzag shape, a wave-like shape, or an arc shape at the tread road contact surface.

For example, the sipe wall face of a three-dimensional sipe may have a structure in which pyramids and inverted pyramids are connected in the sipe length direction (not illustrated). In other words, the sipe wall face is formed by mutually offsetting pitches of a zigzag shape of the tread surface side and a zigzag shape of the bottom side in the tire width direction so that mutually opposing protrusions and recesses are formed by the zigzag shapes on the tread surface side and the bottom side. Additionally, with these protrusions and recesses, when viewed in a tire rotation direction, the sipe wall face is formed by connecting a protrusion inflection point on the tread surface side to a recess inflection point on the bottom side, a recess inflection point on the tread surface side to a protrusion inflection point on the bottom side, and protrusion inflection points mutually adjacent to the protrusion inflection point on the tread surface side and the protrusion inflection point on the bottom side with ridge lines; and by connecting these ridge lines with consecutive planes in the tire width direction. Additionally, a first sipe wall face has a corrugated surface wherein convex pyramids and inverted pyramids are arranged alternating in the tire width direction; and a second sipe wall face has a corrugated surface wherein concave pyramids and inverted pyramids are arranged alternating in the tire width direction. Furthermore, with the sipe wall face, at least the corrugated surfaces disposed at outermost sides of both ends of the sipe are oriented toward an outer side of the blocks. Note that examples of such a three-dimensional sipe include the technology described in Japanese Patent No. 3894743.

For example, the sipe wall face of the three-dimensional sipe may have a structure in which a plurality of prism shapes having a block shape are connected in the sipe depth direction and the sipe length direction while inclining with respect to the sipe depth direction (not illustrated). In other words, the sipe wall face has a zigzag shape in the tread surface. Additionally, the sipe wall face has bent sections in at least two locations in the tire radial direction in the blocks that bend in the tire circumferential direction and are connected in the tire width direction. Moreover, these bent sections have a zigzag form that has an amplitude in the tire radial direction. Additionally, while, in the sipe wall face, the amplitude is constant in the tire circumferential direction, an inclination angle in the tire circumferential direction with respect to a normal line direction of the tread surface is configured so as to be smaller at a portion on the sipe bottom side than at a portion on the tread surface side; and the amplitude in the tire radial direction of the bent section is configured so as to be greater at a portion on the sipe bottom side than at a portion on the tread surface side. Note that examples of such a three-dimensional sipe include the technology described in Japanese Patent No. 4316452.

Chamfered Portion of the Block

As illustrated in FIGS. 4 and 5, the blocks 321, 322 of the second land portion 32 include a chamfered portion 325 in a corner portion. As a result, the uneven wear of the blocks 321, 322 is suppressed.

For example, in the configuration illustrated in FIG. 4, the chamfered portion 325 is formed in each acute corner portion of the portions of the blocks 321, 322 of the second land portion 32 divided by the circumferential narrow grooves 323, 324. Additionally, the ridge line of a portion of the chamfered portion 325 is inclined with respect to the tire width direction at a predetermined inclination angle θ3. As a result, the length of the edge portion of the block 322 is ensured and performance on snow is enhanced.

Modified Examples

Figure 6:
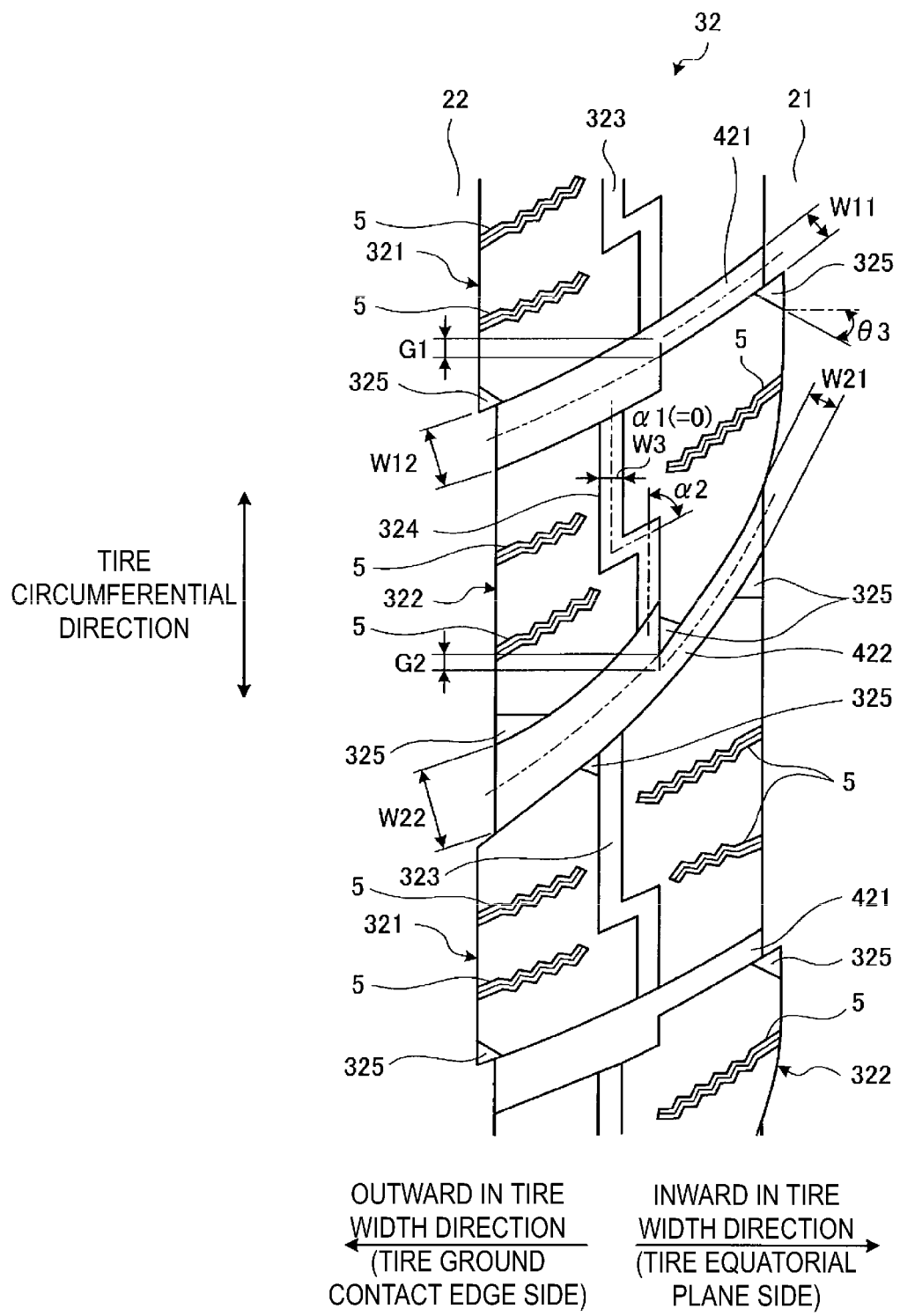
FIG. 6 is an explanatory drawing illustrating a modified example of the pneumatic tire depicted in FIG. 2.

FIG. 6 is an explanatory drawing illustrating a modified example of the pneumatic tire depicted in FIG. 2. FIG. 6 is an enlarged view of the second land portion 32.

In the configuration illustrated in FIG. 2, as illustrated in FIG. 4, the edge portions on the lug grooves 421, 422 sides of the blocks 321, 322 have a step offset in the tire circumferential direction. This step has the opening portions of the circumferential narrow grooves 323, 324 as boundaries. Additionally, the edge portions of opposing blocks 321, 322 have a step offset in the same direction. As a result, lengths in the tire circumferential direction of the portions of the blocks 321, 322 divided by the circumferential narrow grooves 323, 324 are adjusted, and rigidity of the portions of the blocks 321, 322 is made uniform.

In contrast, in the configuration illustrated in FIG. 6, the edge portion on the lug grooves 421, 422 sides of a first block 321 is stepless and has a flat shape; and the edge portion on the lug grooves 421, 422 sides of a second block 322 has a step offset in the tire circumferential direction. This step has the opening portions of the circumferential narrow grooves 323, 324 as boundaries. Specifically, the block 322, for which the circumferential length on the tire equatorial plane CL side is reduced due to the difference between the inclination angles θ1, θ2 (see FIG. 3) of the lug grooves 421, 422, has a step protruding to the lug grooves 421, 422 sides in a region farther to the tire equatorial plane CL side than the circumferential narrow groove 324. As a result, length in the tire circumferential direction of the portion of the block 322 on the tire equatorial plane CL side where the circumferential length is reduced is ensured, and rigidity of the portions of the blocks 321, 322 is made uniform.

Effects

As described above, this pneumatic tire 1 includes at least four of the circumferential main grooves 21, 22 extending in the tire circumferential direction; and at least five rows of land portions 31 to 33 including the center land portion 31, the pair of second land portions 32, 32, and the pair of shoulder land portions 33, 33, which are defined by these circumferential main grooves 21, 22 (see FIG. 2). Additionally, at least one of the second land portions 32 is provided with a plurality of lug grooves 421, 422 penetrating through the second land portion 32 in the tire width direction, and a plurality of blocks 321, 322 defined by the plurality of lug grooves 421, 422 (see FIG. 3). Moreover, the plurality of blocks 321, 322 include one of the circumferential narrow grooves 323, 324, respectively, which penetrates through the blocks 321, 322 in the tire circumferential direction.

In this configuration, the blocks 321, 322 of the second land portion 32 each include one of the circumferential narrow grooves 323, 324 penetrating through the blocks 321, 322 in the tire circumferential direction. As such, rigidity in the tire width direction of each of the blocks 321, 322 is alleviated. Such a configuration is advantageous because the ground contact patch pressure of the blocks 321, 322 when the tire contacts the ground is reduced, and uneven wear of the blocks 321, 322 is suppressed. Additionally, such a configuration is advantageous because the edge components of the blocks 321, 322 are increased due to the circumferential narrow grooves 323, 324, and the performance on snow of the tire is enhanced.

With this pneumatic tire 1, the lug grooves 421, 422 have a bent shape (see FIG. 3). Such a configuration is advantageous because the edge component of the second land portion 32 is increased, and the performance on snow of the tire is enhanced.

With this pneumatic tire 1, the blocks 321, 322 of the second land portion 32 that are adjacent to each other in the tire circumferential direction have mutually different shapes (see FIG. 3). In this configuration, air column resonance is blocked and external noise is reduced. Such a configuration is advantageous because the noise performance of the tire is enhanced.

With this pneumatic tire 1, the circumferential narrow grooves 323, 324 have bent shapes that have an amplitude in the tire width direction (see FIG. 3). In this configuration, the edge components in the tire circumferential direction are increased due to the bent shapes of the circumferential narrow grooves 323, 324, which leads to an enhancement in the traction characteristics. Such a configuration is advantageous because performance on snow of the tire is enhanced.

With the pneumatic tire 1, the circumferential narrow grooves 323, 324 include the first inclined portion inclining at the inclination angle α1 with respect to the tire circumferential direction, and the second inclined portion inclining at the inclination angle α2 with respect to the tire circumferential direction, the first inclined portion and the second inclined portion being connected alternately (see FIG. 3). Additionally, the inclination angle α1 of the first inclined portion is such that 0 degrees≤α1≤15 degrees, and the inclination angle α2 of the second inclined portion is such that 45 degrees≤α2≤90 degrees. In this configuration, the edge components in the tire circumferential direction are increased due to the bent shapes of the circumferential narrow grooves 323, 324, which leads to an enhancement in the traction characteristics. Such a configuration is advantageous because performance on snow of the tire is enhanced.

With this pneumatic tire 1, the groove width W3 of the circumferential narrow grooves 323, 324 is such that 1.5 mm≤W3≤6.0 mm (see FIG. 4). Such a configuration is advantageous because the groove width W3 of the circumferential narrow grooves 323, 324 is ensured and the edge components of the circumferential narrow grooves 323, 324 are ensured.

With this pneumatic tire 1, the circumferential narrow grooves 323, 324 adjacent to each other in the tire circumferential direction open at mutually different positions with respect to common lug grooves 421, 422 (see FIG. 4). In this configuration, the opening positions of the circumferential narrow grooves 323, 324 adjacent to each other are disposed so as to be dispersed in the tire width direction, and the overall rigidity of the second land portion 32 is made uniform. Such a configuration is advantageous because uneven wear of the land portion 32 is suppressed.

With this pneumatic tire 1, the crossing angles θ1, θ2 of the lug grooves 421, 422 in the second land portion 32 with the circumferential main groove 21 on the tire equatorial plane CL side of the second land portion 32 is in a range of not less than 15 degrees and not greater than 75 degrees (see FIG. 3). Such a configuration is advantageous because the crossing angles θ1, θ2 of the lug grooves 421, 422 with the circumferential main groove 21 is made appropriate. That is, the snow discharge properties and water drainage properties from the circumferential main groove 21 to lug grooves 421, 422 are enhanced due to the crossing angles θ1, θ2 being not less than 15 degrees. Additionally, the edge components of the lug grooves 421, 422 are ensured and the performance on snow of the tire is ensured due to the crossing angles θ1, θ2 being not greater than 75 degrees.

With this pneumatic tire 1, the opening widths W11, W21, of the lug grooves 421, 422 in the second land portion 32 on the tire equatorial plane CL side, are narrower than the opening widths W12, W22 on the tire ground contact edge T side (see FIG. 4). In this configuration, air column resonance is blocked and external noise is reduced. Such a configuration is advantageous because the noise performance of the tire is enhanced. Additionally, in this configuration, rigidity of the edge portion of the second land portion 32 on the tire equatorial plane CL side is ensured and uneven wear of the second land portion 32 is suppressed. Such a configuration is advantageous because the uneven wear resistance of the tire is enhanced.

With this pneumatic tire 1, the lug grooves 421, 422 in the second land portion 32 have an offset shape in which the groove center line on the tire equatorial plane CL side and the groove center line on the tire ground contact edge T side are mutually offset at crossing positions with the circumferential narrow grooves (see FIG. 4). Such a configuration is advantageous because the edge components of the lug grooves 421, 422 are increased, and the performance on snow of the tire is enhanced.

With this pneumatic tire 1, the offset directions of the offset shapes of the pair of lug grooves 421, 422 adjacent to each other in the tire circumferential direction are mutually different (see FIG. 4). Such a configuration is advantageous because rigidity of the blocks 321, 322 defined by the lug grooves 421, 422 is made appropriate. Particularly, because the offset shape of the lug grooves 421, 422 is made appropriate as described above, the length in the tire circumferential direction, of portions (the portion on the tire ground contact edge T side of the block 321 divided by the circumferential narrow groove 323, and the portion on the tire equatorial plane CL side of the block 322 divided by the circumferential narrow groove 324) of the blocks 321, 322 where width is reduced due to the difference between the inclination angles θ1, θ2 of the lug grooves 421, 422, is suitably ensured. As a result, rigidity of the portions of the blocks 321, 322 where the width is reduced is suitably ensured.

With this pneumatic tire 1, the lug groove 421 (422) includes the raised bottom portion 4211 in the region from the circumferential narrow groove 323 (324) to the tire equatorial plane CL side (see FIG. 5). Such a configuration is advantageous because rigidity of the region on the tire equatorial plane CL side of the second land portion 32 is ensured, and the steering stability performance of the tire is enhanced.

With this pneumatic tire 1, the pair of lug grooves 421, 422 adjacent to each other in the tire circumferential direction are inclined in the same direction with respect to the tire circumferential direction and have mutually different inclination angles (see FIG. 3). Additionally, extension lines of the groove center lines of the pair of lug grooves 421, 422 cross each other at an edge portion of the center land portion 31 adjacent to the second land portion 32. Such a configuration is advantageous because drainage flow paths are smoothly divided, leading to drainage properties being enhanced, and wet performance of the tire is enhanced.

With this pneumatic tire 1, the edge portion of the center land portion 31 includes the notched portion 312 in a region that includes the crossing point of the extension lines of the groove center lines of the pair of lug grooves 421, 422 (see FIG. 3). Such a configuration is advantageous because the notched portion 312 becomes a base point of discharge of mud or snow packed in the groove portions, and mud discharge properties and snow discharge properties are enhanced.

With this pneumatic tire 1, the blocks 321, 322 of the second land portion 32 include the plurality of sipes 5 (see FIG. 4). A ratio of a disposal density of the sipes 5 in a first portion to a disposal density of the sipes 5 in a second portion of the blocks 321, 322 divided by the circumferential narrow grooves 323, 324 is in a range of not less than 0.8 to not greater than 1.2. Such a configuration is advantageous because rigidity of each portion of the blocks 321, 322 divided by the circumferential narrow grooves 323, 324 is made uniform, and uneven wear of the blocks 321, 322 is suppressed. Additionally, such a configuration is advantageous because the edge components are increased due to the sipes 5, and the performance on snow of the tire is enhanced.

With this pneumatic tire 1, the blocks 321, 322 of the second land portion 32 include the plurality of sipes 5 (see FIG. 4). Additionally, the ratio of circumferential lengths of the portions of the blocks 321, 322 defined by the sipes 5 is in a range of not less than 0.8 and not greater than 1.2. Such a configuration is advantageous because rigidity of the portions of the blocks 321, 322 defined by the sipes 5 is made uniform, and uneven wear of the blocks 321, 322 is suppressed. Additionally, such a configuration is advantageous because the edge components are increased due to the sipes 5, and the performance on snow of the tire is enhanced.

With this pneumatic tire 1, the blocks 321, 322 include the chamfered portion 325 in the corner portion (see FIGS. 4 and 5). Such a configuration is advantageous because the uneven wear of the blocks 321, 322 can be suppressed.

With this pneumatic tire 1, the ridge line of the chamfered portion 325 is inclined with respect to the tire width direction (see FIG. 4). Such a configuration is advantageous because the edge components of the lug grooves 421, 422 are ensured due to the ridge line of the chamfered portion 325 having the inclination angle θ3 (see FIG. 4), and the performance on snow of the tire is enhanced.

EXAMPLES

FIG. 7 is a table showing results of performance testing of pneumatic tires according to embodiments of the present technology.

In the performance testing, a plurality of types of pneumatic test tires were evaluated for (1) performance on snow, (2) uneven wear resistance performance, and (3) noise performance. Each of the test tires had a tire size of 265/65R17 112H and was assembled on a on a rim with a rim size of 17×8J. The test tires were inflated to an air pressure of 230 kPa and loaded with the maximum load stipulated by JATMA. The test tires were mounted on all the wheels of a test vehicle, namely, a four wheel drive recreational vehicle (RV) with an engine displacement of 3.5 L.

(1) Evaluation of performance on snow: The test vehicle was driven on a snowy road surface of a snowy road test site, and the braking distance from a traveling speed of 40 km/h was measured. The measurement results were indexed and the index value of the Conventional Example was defined as the reference (100). In this evaluation, higher scores are more preferable.

(2) Evaluation of wear resistance performance: The test vehicle was driven on a paved road for 50000 km and, thereafter, the amount of wear of the second land portion and the uneven wear that occurred in the second land portion was observed. Thus, the wear resistance performance was evaluated. The results of the evaluations were indexed and the index value of the Conventional Example was defined as the reference (100). Higher scores are more preferable.

(3) Evaluation of noise performance: The test vehicle was driven on an International Organization for Standardization (ISO) test road at a speed of 80 km/h, and the sound pressure level of the pass-by noise (external noise) thereof was measured. Thus, the noise performance was evaluated. The results of the evaluations were indexed and the index value of the Conventional Example was defined as the reference (100). Larger scores indicate lower sound pressures levels and are preferable.

The test tires of Examples 1 to 8 have structures based on that illustrated in FIGS. 1 to 5, wherein the blocks 321, 322 of the second land portion 32 include the circumferential narrow grooves 323, 324, respectively. Additionally, the groove depth D1 of the circumferential main groove 22 (FIG. 5) is such that D1=10.0 mm, and the maximum groove depth D2 of the lug grooves 421, 422 in the second land portion 32 (FIG. 5) is such that D2=7.0 mm. Moreover, the groove width W3 of the circumferential narrow grooves 323, 324 (FIG. 4) is such that W3=2.0 mm, and the groove depth D4 (FIG. 5) is such that D4=5.0 mm. Furthermore, the offset amounts G1, G2 of the groove center lines of the lug grooves 421, 422 in the second land portion 32 is such that G1=G2=6.0 mm.

The test tire of the Conventional Example has a structure based on that illustrated in FIGS. 1 to 5, except that the blocks 321, 322 of the second land portion 32 do not include the circumferential narrow grooves 323, 324. Additionally, the inclination angles θ1, θ2 of the lug grooves 421, 422 in the second land portion 32 are constant and the lug grooves 421, 422 adjacent with each other are parallel with each other.

As shown in the test results, it is clear that performance on snow, uneven wear resistance performance, and noise performance of the tire is enhanced in the test tires of Examples 1 to 8.

The invention claimed is:

1. A pneumatic tire, comprising:
   at least four circumferential main grooves extending in a tire circumferential direction; and
   a least five land portions including a center land portion, a pair of second land portions, and a pair of shoulder land portions that are defined by the circumferential main grooves;
   at least one second land portion of the pair of second land portions including a plurality of lug grooves penetrating through the at least one second land portion in a tire width direction, and a plurality of blocks defined by the plurality of lug grooves;
   the plurality of blocks each including one circumferential narrow groove penetrating through the block in the tire circumferential direction;
   the plurality of lug grooves in the at least one second land portion each having an offset shape in which a groove center line on the tire equatorial plane side and a groove center line on the tire ground contact edge side are mutually offset at a crossing position with the circumferential narrow groove; and
   offset directions of the offset shapes of a pair of lug grooves of the plurality of lug grooves adjacent to each other in the tire circumferential direction being mutually different.

2. The pneumatic tire according to claim 1, wherein:
   the plurality of lug grooves each have a bent shape.

3. The pneumatic tire according to claim 1, wherein:
   blocks of the plurality of blocks adjacent to each other in the tire circumferential direction have mutually different shapes.

4. The pneumatic tire according to claim 1, wherein:
   the circumferential narrow groove has a bent shape that has an amplitude in the tire width direction.

5. The pneumatic tire according to claim 1, wherein:
   the circumferential narrow groove comprises a first inclined portion inclining at an inclination angle α1 with respect to the tire circumferential direction, and a second inclined portion inclining at an inclination angle α2 with respect to the tire circumferential direction, the first inclined portion and the second inclined portion being connected alternately;
   the inclination angle α1 of the first inclined portion is such that 0 degrees≤α1≤15degrees; and
   the inclination angle α2 of the second inclined portion is such that 45 degrees≤α2≤90 degrees.

6. The pneumatic tire according to claim 1, wherein:
   a groove width W3 of the circumferential narrow groove is such that 1.5 mm≤W3≤6.0 mm.

7. The pneumatic tire according to claim 1, wherein:
   the circumferential narrow grooves adjacent to each other in the tire circumferential direction open at mutually different positions with respect to a common lug groove of the plurality of lug grooves.

8. The pneumatic tire according to claim 1, wherein:
crossing angles of the plurality of lug grooves in the at least one second land portion with one of the circumferential main grooves on a tire equatorial plane side of the at least one second land portion are in a range of not less than 15 degrees and not greater than 75 degrees.

9. The pneumatic tire according to claim 1, wherein:
the plurality of lug grooves in the at least one second land portion each have an opening width on the tire equatorial plane side that is narrower than an opening width on a tire ground contact edge side.

10. The pneumatic tire according to claim 1, wherein:
the plurality of lug grooves each comprise a raised bottom portion in a region from the circumferential narrow groove to the tire equatorial plane side.

11. The pneumatic tire according to claim 1, wherein:
a pair of lug grooves of the plurality of lug grooves adjacent to each other in the tire circumferential direction have inclination angles inclining in a same direction with respect to the tire circumferential direction and are mutually different; and
extension lines of the groove center lines of the pair of lug grooves cross each other at an edge portion of the center land portion adjacent to the at least one second land portion.

12. The pneumatic tire according to claim 11, wherein:
the edge portion of the center land portion comprises a notched portion in a region including a crossing point of the extension lines of the groove center lines of the pair of lug grooves.

13. The pneumatic tire according to claim 1, wherein:
the plurality of blocks of the at least one second land portion each comprise a plurality of sipes; and
a ratio of a disposal density of the plurality of sipes in a first portion to a disposal density of the plurality of sipes in a second portion of each of the plurality of blocks divided by the circumferential narrow groove is in a range of not less than 0.8 and not greater than 1.2.

14. The pneumatic tire according to claim 1, wherein:
the plurality of blocks of the at least one second land portion each comprise a plurality of sipes; and
a ratio of circumferential lengths of portions of each of the plurality of blocks defined by the plurality of sipes is in a range of not less than 0.8 and not greater than 1.2.

15. The pneumatic tire according to claim 1, wherein:
the plurality of blocks each comprise a chamfered portion in a corner portion.

16. The pneumatic tire according to claim 15, wherein:
a ridge line of the chamfered portion inclines with respect to the tire width direction.

* * * * *